United States Patent [19]
Hopf et al.

[11] Patent Number: 5,499,541
[45] Date of Patent: Mar. 19, 1996

[54] PIEZOELECTRIC FORCE SENSOR

[75] Inventors: Gerald Hopf; Botho Ziegenbein; Bernd Maihoefer, all of Reutlingen, Germany

[73] Assignee: Robert Bosch GmbH, Stuttgart, Germany

[21] Appl. No.: 278,667

[22] Filed: Jul. 21, 1994

[30] Foreign Application Priority Data

Jul. 23, 1993 [DE] Germany .................. 43 24 692.3

[51] Int. Cl.⁶ .................. G01L 1/18; G01L 25/00
[52] U.S. Cl. .................. 73/763; 84/DIG. 24; 361/280
[58] Field of Search .................. 73/763, 780; 361/280, 361/281, 290; 328/1; 324/727; 84/DIG. 24

[56] References Cited

U.S. PATENT DOCUMENTS

| | | | |
|---|---|---|---|
| Re. 33,691 | 9/1991 | Harnden, Jr. et al. | 310/332 |
| 2,933,665 | 4/1960 | Dimeff | 73/780 |
| 3,126,509 | 3/1964 | Pulvan | 323/364 |
| 3,202,891 | 8/1965 | Frankl | 361/280 |
| 3,426,209 | 2/1969 | Sihvonen et al. | 250/214.1 |
| 3,515,987 | 6/1970 | Zurbrick et al. | 324/687 |
| 4,716,331 | 12/1987 | Higgins, Jr. | 310/330 |
| 4,766,368 | 8/1988 | Cox | 324/688 |
| 4,819,126 | 4/1989 | Kornrumpf et al. | 361/207 |
| 5,322,969 | 6/1994 | Aaroe et al. | 84/731 |
| 5,375,469 | 12/1994 | Levy et al. | 73/517 R |
| 5,392,651 | 2/1995 | Suzuki et al. | 73/517 R |
| 5,396,798 | 3/1995 | Frische | 73/517 R |

FOREIGN PATENT DOCUMENTS

| | | | |
|---|---|---|---|
| 59-75114 | 4/1984 | Japan | 73/763 |
| 1663410 | 7/1991 | U.S.S.R. | 73/780 |
| WO88/10431 | 12/1988 | WIPO . | |

Primary Examiner—Richard Chilcot
Assistant Examiner—George M. Dombroske
Attorney, Agent, or Firm—Kenyon & Kenyon

[57] ABSTRACT

A piezoelectric force sensor includes a piezoelectric plate, with one electrode on each of the top and bottom sides of the plate. One of the electrodes is electrically connected via a conductor to a contact pad. In the case that the piezoelectric plate experiences breakage, the conductor is broken, and the remaining residual capacitance of the conductor and contact pad becomes so comparatively small that the breakage can be reliably detected.

9 Claims, 4 Drawing Sheets

PIEZOELECTRIC FORCE SENSOR

FIELD OF THE INVENTION

The present invention relates to piezoelectric force sensors. More specifically, the present invention relates to a piezoelectric force sensor comprising at least one piezoelectric plate that is subjected to bending, on whose top side and bottom side electrodes are applied.

BACKGROUND OF THE INVENTION

PCT Published Application No. WO 88/10431 describes a piezoelectric force sensor that is designed as an acceleration sensor. The acceleration sensor is comprised of a circular piezoelectric plate, which is made of two piezoelectric half-plates. The piezoelectric plate is supported centrally on a base and is deformed by an acceleration.

SUMMARY OF THE INVENTION

The present invention relates to a piezoelectric force sensor comprising at least one piezoelectric plate, with electrodes arranged on both top and bottom sides of the plate. At least one conductor coupled to a contact pad for external connection and in electrical contact with at least one of the electrodes, is further arranged on the piezoelectric plate so that the conductor would be broken if the piezoelectric plate is broken.

An advantage of the piezoelectric force sensor of the present invention is that breakage of the piezoelectric plate, as can occur as a result of overloading of force, can be reliably detected.

Since most breaks occur along a bending line of the piezoelectric plate, it is especially advantageous for the conductor to be arranged to cross the bending line at least once. In addition, it is advantageous for the contact pad to which the conductor is coupled to be situated in the bearing area, because the good support in this area makes it especially suitable for connecting external bonding wires there. The conductor according to the present invention is applied quite simply, directly to the top surface of the piezoelectric plate, provided that the conductor and the contact pad are small enough. One can further improve the ability to detect breakage by using a ceramic plate having a small dielectric constant, since the remaining residual capacitance will be especially small as a result. Furthermore, this enables a separate manufacturing of the piezoelectric plate and of the ceramic plate, so that the parts in question can be manufactured quite simply. In the case of a rectangular piezoelectric plate, the conductor expediently crosses the bending line at an angle of approximately 90°. In the case of a circular piezoelectric plate, each tangent on the circular bending line advantageously intersects the conductor at least one point, to guarantee that breakage is reliably detected.

DETAILED DESCRIPTION OF THE DRAWINGS

Figure 1:
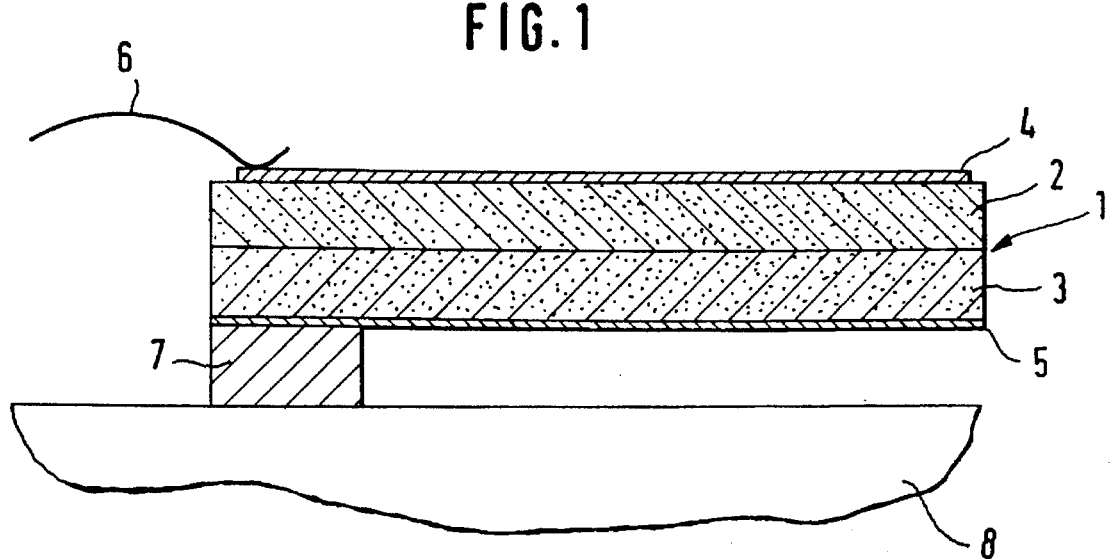
FIG. 1 shows a side view of a piezoelectric force sensor, according to the present invention, that is supported on one side.
Figure 2:
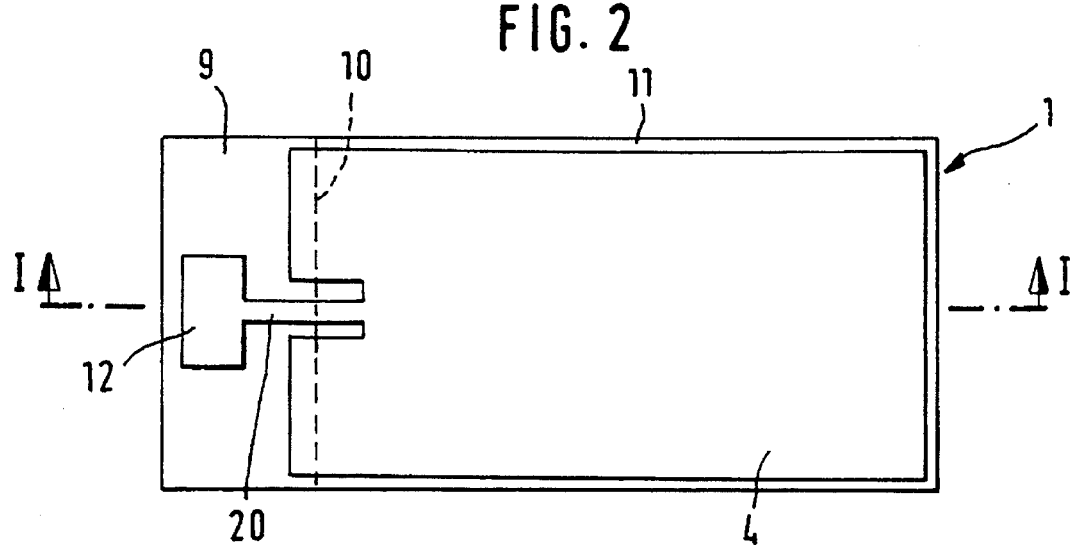
FIG. 2 is a top view of the piezoelectric force sensor of FIG. 1.

FIGS. 1 and 2 depict a first exemplified embodiment of a force sensor according to the present invention. FIG. 1 shows a cross-section of the force sensor along the line I—I of the top view shown in FIG. 2. A piezoelectric plate 1, which is comprised of two half-plates 2 and 3, is secured on its bottom side by means of a pedestal 7 to a support 8. Applied to the bottom side of the piezoelectric plate 1 is an electrode 5 covering the entire bottom surface. Applied to the top side of the piezoelectric plate 1 is a structured electrode 4. Electrical connection to the electrode 4 is provided by a bonding wire 6, which is secured to a contact pad 12. Because forces act on the substrate when the bonding wire 6 is secured, it is advantageous to arrange the contact pad 12 over the pedestal 7, as this area is especially mechanically stable. The electrical contact between the contact pad 12 and the electrode 4 is provided by a conductor 20. For the sake of simplification, the bonding wire 6 is not shown in the top view of FIG. 2. Electrical connection to the electrode 5 is achieved, for example, by making the pedestal 7 conductive and by applying additional conductors to the support 8. The area of the piezoelectric plate 1, which is situated above the pedestal 7, is designated as the bearing area 9.

The force sensor of FIGS. 1 and 2 is used as an acceleration sensor. An acceleration in a direction perpendicular to the top surface of the support 8 causes a movable area 11, which is not supported by the pedestal 7, to move in relation to the support 8. As a result, the piezoelectric plate 1 is subjected to a strong mechanical stressing, especially along a bending line 10 which lies between the bearing area 9 and the movable area 11. In the case of substantial mechanical stressing, as caused for example by a very strong acceleration, a break preferably occurs along the bending line 10. Such a break causes the conductor 20, which crosses over the bending line 10, to also break. If one measures the capacitance of the piezoelectric plate 1 through the conductor 20, one would obtain markedly different values before and after the break in the piezoelectric plate 1 occurs. Thus, by measuring the capacitance of the piezoelectric plate 1, one can determine whether the piezoelectric plate 1 has been damaged or not.

The two half-plates 2 and 3 of the piezoelectric plate 1 exhibit piezoelectric polarizations whose directions oppose one another. By arranging the two piezoelectric half-plates 2 and 3 in this manner, electric charges on the electrodes 4 and 5 can be detected when the piezoelectric element 1 is subjected to deformation. These deformations can not only be produced by an acceleration, but also by every other form of mechanical force being introduced to the piezoelectric plate 1. Of course, many other forms of the bearing arrangement and deformation of the piezoelectric plate 1 are possible.

Figure 3:
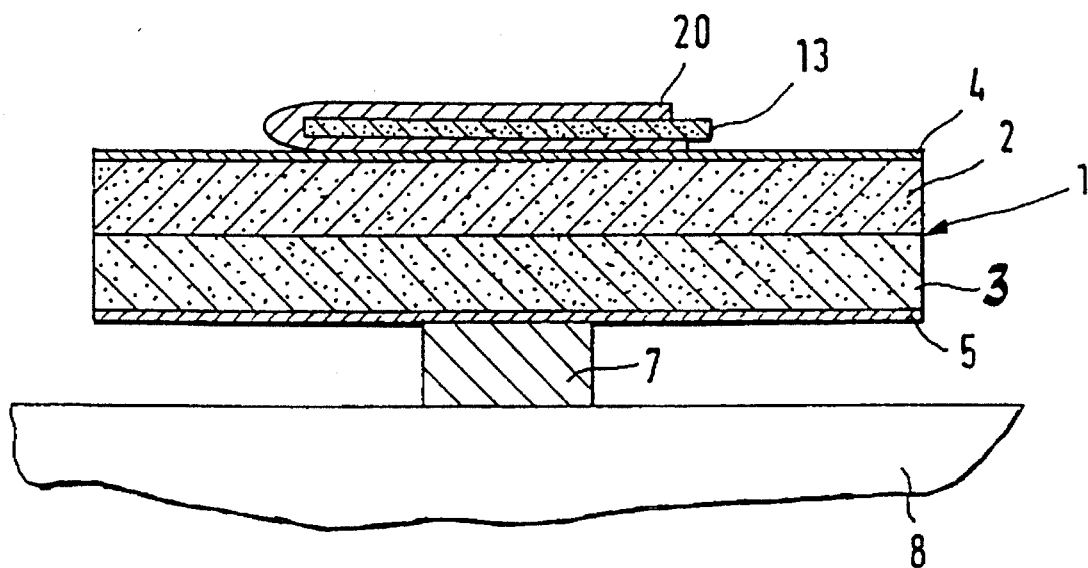
FIG. 3 is a side view of a centrally supported piezoelectric force sensor in accordance with the present invention.
Figure 4:
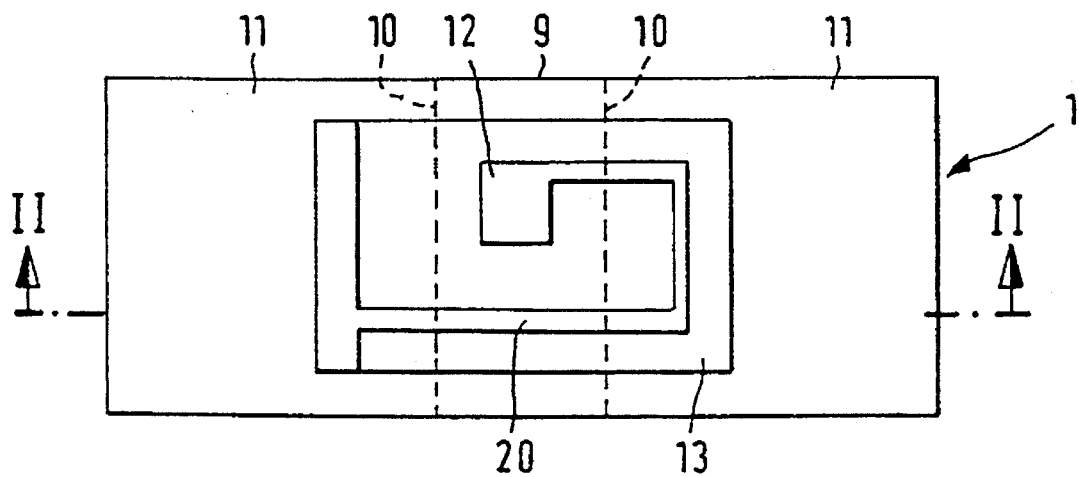
FIG. 4 is a top view of the piezoelectric force sensor of FIG. 3.

Another arrangement of the pedestal 7 and the piezoelectric plate 1 is depicted in FIG. 3, a cross-sectional view, and FIG. 4, a top view. The piezoelectric plate 1, which is made, in turn, of two half-plates 2 and 3, is arranged on the pedestal 7 so as to allow two equal-sized movable areas 11 to be arranged on both sides of the bearing area 9. Thus, this piezoelectric force sensor exhibits two bending lines 10. The piezoelectric polarization of the two piezoelectric half-plates 2 and 3 are again in opposite directions. Applied to the top and bottom sides of the piezoelectric plate 1 are electrodes 4 and 5, respectively, which cover the entire surface of the top side and bottom sides of the piezoelectric plate 1.

The method of functioning of the piezoelectric force sensor of FIGS. 3 and 4 corresponds to the method of functioning of the piezoelectric force sensor of FIGS. 1 and 2. As a result of an acceleration in a direction perpendicular to the top surface of the support 8, the two movable areas 11 are moved in relation to the support plate 8. This deformation of the piezoelectric plate 1 again causes electric charges to be produced in the electrodes 4 and 5, which when detected, reveal information about the acceleration. Therefore, to detect the acceleration, the electrodes 4 and 5 are connected to external circuits for purposes of evaluation.

Electrical contact to the bottom electrode 5 is again achieved, for example, by making the pedestal 7 conductive. However, one can also conceive of other methods for electrically contacting the bottom electrode 5. The top electrode 4 is also contacted by a conductor 20, which upon breakage of the piezoelectric element 1 is broken along the bending line 10. The conductor 20 is applied to a ceramic plate 13, with the ceramic plate 13, in turn, being applied to the top side of the piezoelectric plate 1. As can be seen in the side view in FIG. 3, the conductor 20 is designed to allow an electrical connection to be established from the top side of the ceramic plate 13 to the bottom side of the ceramic plate 13. Preferably, the conductor 20 completely covers the bottom side of the ceramic plate 13, so that a contacting to the electrode 4 is produced over an especially large surface area. To manufacture the conductor 20 on the ceramic plate 13, silk-screen printing of thick-film pastes on the ceramic plate 13 can be used.

A refinement, in which the conductor 20 is situated on the top side of the ceramic plate 13, is shown by the top view in FIG. 4. Beginning from a starting area 12, on which, for example, a bonding wire would again be secured, the conductor 20 is run on the top side of the ceramic plate 13 so as to allow it to cross over both bending lines 10. This measure ensures that, in the case of a break in the ceramic plate 13 along the bending lines 10 of the piezoelectric plate 1, the electrical connection from the contact pad 12 to the electrode 4 is reliably broken.

A number of advantages are achieved by the use of the ceramic plate 13. First of all, the conductor 20 and the piezoelectric plate 1 can be manufactured independently of one another. This is especially advantageous, since in this manner an electrode 4 covering the entire surface can be used on the top side of the piezoelectric plate 1. Thus, a structuring of the metallic layer must take place on the top side of the piezoelectric plate. Furthermore, by properly selecting the material for the ceramic plate 13, the residual capacitance of the conductor 20 is reduced after the piezoelectric plate 1 experiences breakage. For this purpose, a material having a small dielectric constant should be used for the ceramic plate 13. As a rule, piezoelectric materials have a very high dielectric constant, on the order of magnitude of 2000. Furthermore, piezoelectric materials demonstrate a very high temperature sensitivity of the dielectric constants, for example, on the order of magnitude of 1% per degree kelvin. If the piezoelectric plate of FIGS. 3 and 4 were, for example, to break off only on one side, then because of the high sensitivity of the capacitance to temperature changes, it could not be decided without the conductor 20, whether the piezoelectric plate 1 had broken off or not. However, if the conductor 20 is broken, the remaining residual capacitance would be so small, because of the small surface of the conductor 20 and the small dielectric constants of the ceramic plate 13, that it could be established unequivocally, by measuring the capacitance, that the piezoelectric plate 1 had broken off. Therefore, in the case of a conductor 20 applied directly to the piezoelectric plate 1, as shown in FIGS. 1 and 2, it is essential to have the smallest possible surface for the contact pad 12 and the conductor 20, to ensure that the remaining residual capacitance will be small enough after the piezoelectric plate 1 experiences breakage.

It is, of course, understood that the conductor 20 can be arranged not only on the top side of the piezoelectric plate 1, but that it is just as possible to produce a conductor 20 by structuring the bottom electrode 5 or by applying a corresponding ceramic plate 13 to the bottom side of the piezoelectric plate 1. In this case, electrical contacting would not take place through a conductive pedestal 7, but rather the pedestal 7 would be insulating. A contacting of the conductor 20 would then be achieved through conductors applied to the pedestal 7.

To ensure that the conductor 20 which is applied to the ceramic plate 13 is likewise reliably broken when the piezoelectric plate 1 is broken, the ceramic plate 13 is permanently joined to the piezoelectric plate 1. Such a joining can be achieved, for example, by applying a metal-filled adhesive between the ceramic plate 13 and the electrode 4 on the top side of the piezoelectric plate 1. At the same time, such an adhesive agent achieves a good electrical contacting between the conductor 20 on the bottom side of the ceramic plate 13 and the electrode 4. Furthermore, the ceramic plate 13 should consist of a brittle enough material, so that in case the piezoelectric plate 1 experiences breakage, the ceramic plate 13 will likewise break off.

Figure 5:
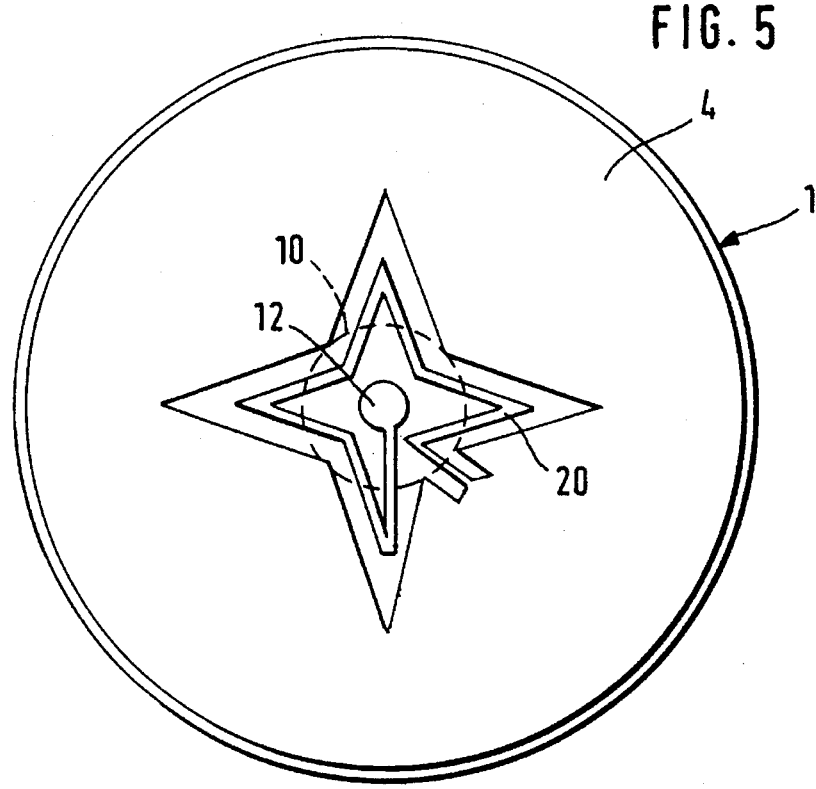
FIG. 5 is a top view of a piezoelectric force sensor, in accordance with the present invention, having a circular piezoelectric plate.

In a top view, FIG. 5 shows an exemplified embodiment of a piezoelectric force sensor in accordance with the present invention having a circular piezoelectric plate 1. The cross-sectional structure of the circular piezoelectric plate 1 shown here is, again, the same as that of the piezoelectric plates shown in FIG. 1 or FIG. 3. The center point of the circular piezoelectric plate 1 is supported by a circular pedestal so as to form a circular bending line 10. Situated on the center point is a contact pad 12, from which the conductor 20 emanates. The conductor 20 crosses the bending line 10 several times until it finally ends at the electrode 4. The conductor 20 shown in FIG. 5 has a star-shaped design and crosses over the bending line at a total of nine places. The conductor 20 is shaped so that each tangent that can be placed against the bending line 10 intersects the conductor 20 at least once. The design of the shape of the conductor 20 starts with the assumption that a breakage in the ceramic plate 1 would primarily form a straight line, this straight line intersecting the bending line at one point. Thus, the design of the conductor 20 ensures that when the piezoelectric plate 1 experiences breakage, the conductor 20 will be reliably broken.

Figure 6:
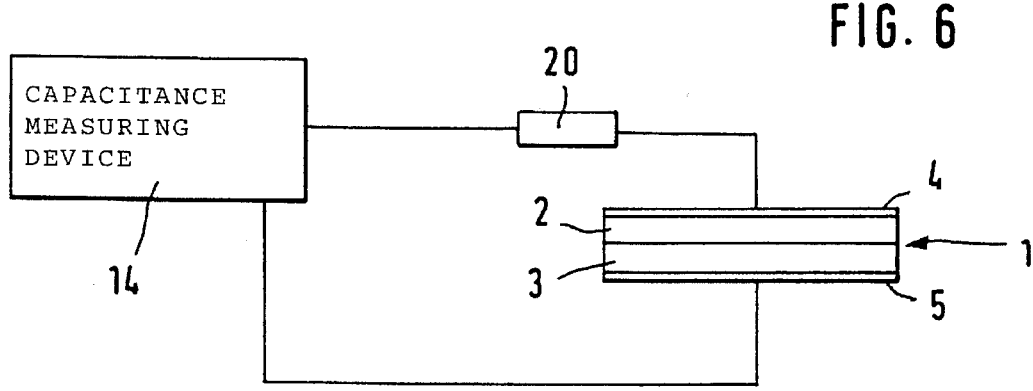
FIG. 6 shows a circuit arrangement comprising a piezoelectric force sensor in accordance with the present invention and a circuit for detecting breakage of the sensor.

FIG. 6 schematically depicts how a breakage experienced by the piezoelectric plate 1 can be established by detecting an associated break in the conductor 20. For this purpose, a capacitance measuring device 14 is connected via the conductor 20 to the electrode 4 of the piezoelectric plate 1. In addition, the capacitance measuring device 14 is connected to the electrode 5 of the piezoelectric plate 1. As long as the piezoelectric plate 1 is directly connected through the conductor 20 to the capacitance measuring device 14, the device 14 measures the relatively large capacitance of the piezoelectric plate 1. In case of a break in the conductor 20, the capacitance measuring device 14 for measuring capacitance measures only the comparatively low capacitance of the supply leads. In this manner, one can clearly differentiate between an intact and a broken piezoelectric plate 1.

Figure 7:
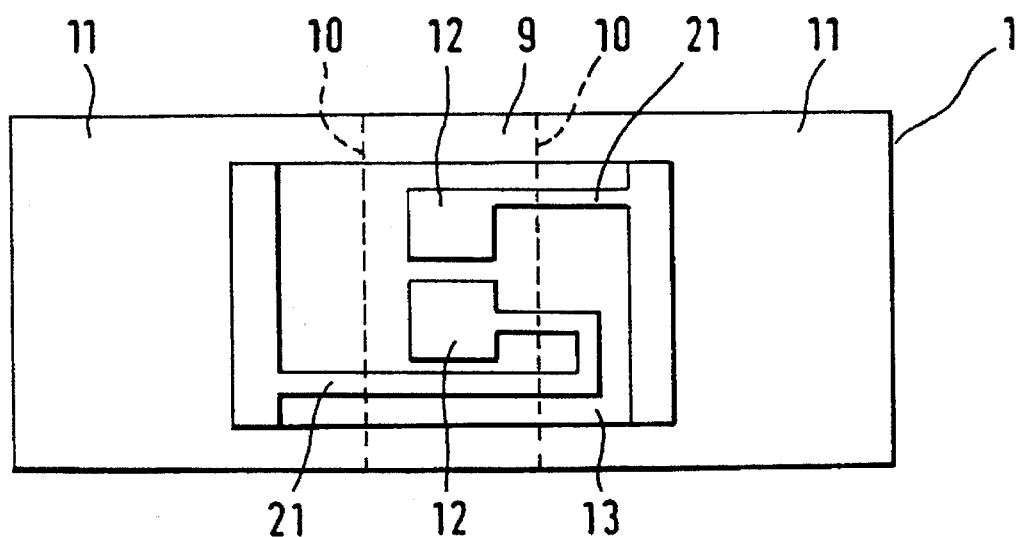
FIG. 7 shows another exemplified embodiment of the force sensor of the present invention.

Another exemplified embodiment of a force sensor according to the present invention is shown in FIG. 7. A ceramic plate 13 is applied to the top side of a piezoelectric plate 1. Two contact pads 12 and two conductors 21 are applied to the ceramic plate 13, the contact pads 12 being situated on the bearing area 9 and the conductors 21 crossing over the bending lines 10. Electrical contact to the electrode 4 arranged on the top side of the piezoelectric plate is achieved through the two contact pads 12. The conductors 21 are again arranged so as to ensure that the conductors 21 break when the piezoplate 1 experiences breakage.

Figure 8:
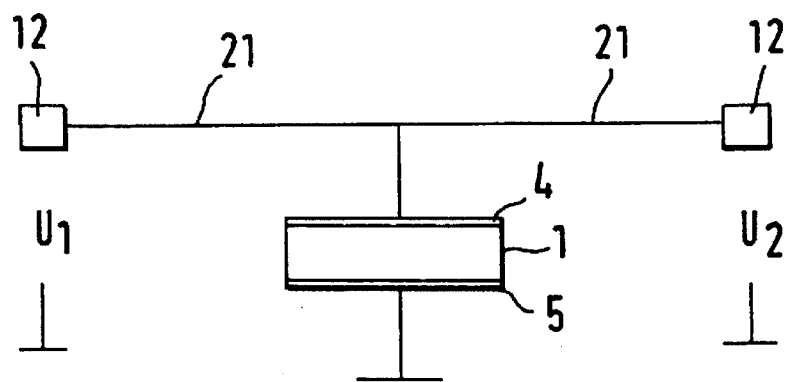
FIG. 8 shows a circuit arrangement corresponding to the force sensor of FIG. 7.

FIG. 8 schematically depicts how the two connections 12 of the electrode 4 of the piezoelectric plate 1 are used to perform a functional test on the force sensor. By way of one of the contact pads 12, an electric test signal U1 is applied via one of the conductors 21 to the electrode 4 on the piezoelectric plate. The second bottom electrode 5 of the piezoelectric plate 1 is connected in this case to ground. The response of the piezoelectric plate 1 to the test signal U1 can be tapped off in the form of an output signal U2 at the other connection 12. Since the test signal is interrupted as a result of a break in the injection branch of the test signal, the sensor no longer reacts to the test signal, and a break in the piezoelectric plate 1 can be reliably detected.

What is claimed is:

1. A piezoelectric force sensor comprising:
   at least one piezoelectric plate that is susceptible to bending, having top and bottom sides;
   at least one electrode arranged on each of the top and bottom sides of the piezoelectric plate;
   at least one conductor arranged on the piezoelectric plate, with which at least one of the at least one electrode is in electrical contact, the conductor being arranged so as to break in the case that the piezoelectric plate experiences breakage; and
   means for determining whether damage has occurred by measuring a capacitance at the at least one conductor.

2. The piezoelectric force sensor according to claim 1, wherein:
   the piezoelectric plate includes at least one bearing area, one bending line, and a movable area;
   the bearing area is fixed by way of a pedestal to a support;
   the movable area is moved by a force in relation to the support;
   the bending line is arranged on the plate between the bearing area and the movable area; and
   the conductor leads from a contact pad to one electrode and crosses over the bending line at least once.

3. The piezoelectric force sensor according to claim 2, wherein:
   the piezoelectric plate has a rectangular shape; and
   the conductor crosses over the at least one bending line at an angle of approximately 90°.

4. The piezoelectric force sensor according to claim 1, wherein:
   the conductor is applied directly to the piezoelectric plate; and
   a combined surface area of the conductor and of the contract pad is at least four times smaller than the surface of the at least one electrode which is in electrical contract with the conductor.

5. The piezoelectric force sensor according to claim 1, further comprising a ceramic plate having a low dielectric constant, and wherein the ceramic plate is applied to the piezoelectrical plate and the conductor is applied to the ceramic plate.

6. The piezoelectric force sensor according to claim 1, wherein the piezoelectric plate can be coupled through the conductor to a device for measuring capacitance, whereby a change in capacitance can be measured in the case of a break in the conductor.

7. The piezoelectric force sensor according to claim 1, wherein a test signal can be applied to the piezoelectric plate through the conductor, and a response of the piezoelectric plate to the test signal can be detected through an additional conductor.

8. A piezoelectric force sensor comprising:
   at least one piezoelectric plate that is susceptible to bending, having top and bottom sides;
   at least one electrode arranged on each of the top and bottom sides of the piezoelectric plate;
   at least one conductor arranged on the piezoelectric plate, with which at least one of the at least one electrode is in electrical contact, the conductor being arranged so as to break in the case that the piezoelectric plate experiences breakage;
   means for determining whether damage has occurred by measuring a capacitance at the at least one conductor; and
   a ceramic plate having a low dielectric constant,
   wherein:
      the ceramic plate is applied to the piezoelectric plate and the conductor is applied to the ceramic plate;
      the electrode covers the top and bottom sides of the piezoelectric plate completely; and
      the conductor leads from a top side of the ceramic plate to a bottom side of the ceramic plate.

9. A piezoelectric force sensor comprising:
   at least one piezoelectric plate that is susceptible to bending, having top and bottom sides;
   at least one electrode arranged on each of the top and bottom sides of the piezoelectric plate;
   at least one conductor arranged on the piezoelectric plate, with which at least one of the at least one electrode is in electrical contact, the conductor being arranged so as to break in the case that the piezoelectric plate experiences breakage;
   means for determining whether damage has occurred by measuring a capacitance at the at least one conductor,
   wherein:
      the piezoelectric plate has a circular shape;
      the bearing area is formed by a circle around a center point of the circular piezoelectric plate;
      the conductor crosses over the circular bending line at least three times; and
      the conductor is designed so as to allow each tangent on the bending line to intersect the conductor at at least one point.

* * * * *